(12) United States Patent
Kurihara (10) Patent No.: US 12,300,842 B2
(45) Date of Patent: May 13, 2025

(54) BATTERY PACK

(71) Applicant: SANYO Electric Co., Ltd., Daito (JP)

(72) Inventor: Hidemi Kurihara, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 634 days.

(21) Appl. No.: 17/630,730

(22) PCT Filed: Jun. 24, 2020

(86) PCT No.: PCT/JP2020/024743
§ 371 (c)(1),
(2) Date: Jan. 27, 2022

(87) PCT Pub. No.: WO2021/019970
PCT Pub. Date: Feb. 4, 2021

(65) Prior Publication Data
US 2022/0263185 A1  Aug. 18, 2022

(30) Foreign Application Priority Data

Jul. 29, 2019  (JP) .................................. 2019-139102

(51) Int. Cl.
*H01M 50/28* (2021.01)
*H01M 10/0525* (2010.01)
(Continued)

(52) U.S. Cl.
CPC ....... *H01M 50/28* (2021.01); *H01M 10/0525* (2013.01); *H01M 50/204* (2021.01);
(Continued)

(58) Field of Classification Search
None
See application file for complete search history.

(56) References Cited

U.S. PATENT DOCUMENTS

| | | | |
|---|---|---|---|
| 2011/0117401 A1* | 5/2011 | Lee ....................... | H01M 50/30 |
| | | | 429/82 |
| 2012/0129034 A1* | 5/2012 | Hasegawa ............... | B32B 27/32 |
| | | | 429/144 |

(Continued)

FOREIGN PATENT DOCUMENTS

| | | |
|---|---|---|
| JP | 10-162795 A | 6/1998 |
| JP | 2001-196039 A | 7/2001 |

(Continued)

OTHER PUBLICATIONS

The EPC Office Action dated Feb. 6, 2023 for the related European Patent Application No. 20847184.7.

(Continued)

*Primary Examiner* — Ula C Ruddock
*Assistant Examiner* — Mary Grace Byram
(74) *Attorney, Agent, or Firm* — WHDA, LLP (57) ABSTRACT

In a battery pack, a heat-resistant cap is coupled to an end of a battery block including battery cells positioned at predetermined positions by a battery holder and a circuit board coupled to a first surface and accommodated in an exterior case. Each of the battery cells includes a discharge valve. A heat-resistant cap includes closing plate portion forming first discharge gap between the cap and an end surface of the battery block, and a peripheral wall portion forming a second discharge gap between the peripheral wall portion and the first surface of the battery block. A circuit board forms a ventilation gap between the circuit board and the first surface of the battery block. The ventilation gap communicates with the second discharge gap.

8 Claims, 7 Drawing Sheets

(51) Int. Cl.
*H01M 50/204* (2021.01)
*H01M 50/213* (2021.01)
*H01M 50/24* (2021.01)
*H01M 50/244* (2021.01)
*H01M 50/249* (2021.01)
*H01M 50/284* (2021.01)
*H01M 50/287* (2021.01)
*H01M 50/289* (2021.01)
*H01M 50/30* (2021.01)
*H01M 50/317* (2021.01)
*H01M 50/367* (2021.01)

(52) U.S. Cl.
CPC ......... *H01M 50/213* (2021.01); *H01M 50/24* (2021.01); *H01M 50/244* (2021.01); *H01M 50/249* (2021.01); *H01M 50/284* (2021.01); *H01M 50/287* (2021.01); *H01M 50/289* (2021.01); *H01M 50/30* (2021.01); *H01M 50/317* (2021.01); *H01M 50/367* (2021.01); *H01M 2220/20* (2013.01)

(56) References Cited

U.S. PATENT DOCUMENTS

| | | | |
|---|---|---|---|
| 2012/0288738 A1* | 11/2012 | Yasui | H01M 50/262 429/82 |
| 2013/0071706 A1* | 3/2013 | Lee | H01M 10/486 429/62 |
| 2013/0082659 A1 | 4/2013 | Kano | |
| 2016/0141573 A1 | 5/2016 | Aoki et al. | |
| 2020/0067045 A1 | 2/2020 | Takano et al. | |
| 2022/0085453 A1* | 3/2022 | Wakabayashi | H01M 50/204 |

FOREIGN PATENT DOCUMENTS

| WO | 2014/065110 A1 | 5/2014 |
|---|---|---|
| WO | 2014/156001 A1 | 10/2014 |
| WO | 2018/123573 A1 | 7/2018 |

OTHER PUBLICATIONS

International Search Report dated Sep. 1, 2020, issued in counterpart International Application No. PCT/JP2020/024743. (2 pages).

* cited by examiner

BATTERY PACK

TECHNICAL FIELD

The present invention relates to a battery pack including battery cells connected in series or in parallel to one another to increase a capacity thereof.

BACKGROUND ART

A battery pack including battery cells accommodated in a case is used as a power source for portable electric device used in cordless. In this battery pack, the battery cells are connected in series or in parallel to increase a capacity. In recent years, a battery pack used as a power source of an electric device has been further required to have a high output, and employed a non-aqueous electrolytic secondary battery such as a lithium ion battery having excellent efficiency per unit volume.

The lithium ion battery has a high output, but has an internal pressure increasing due to some reasons. In order to ensure safety against the increase in the internal pressure of the battery, the battery includes a discharge valve configured to open at a predetermined pressure to prevent rupture. When the discharge valve opens, the battery is in an abnormal heat generation state, and ejects a high-temperature gas vigorously from the discharge valve. A battery pack including the exterior case having a hole therein for discharging exhaust gas discharged from a discharge valve to outside has been developed (see PTL 1)

A battery pack in which air permeability inside the battery pack is improved by providing through-holes in an exterior case and heat is prevented from remaining in the case by facilitating dissipation of heat has been developed (see PTL 2).

CITATION LIST

Patent Literature

PTL 1: Japanese Patent Laid-Open Publication No. 2001-196039
PTL 2: Japanese Patent Laid-Open Publication No. 10-162795

SUMMARY

Technical Problem

In a conventional battery pack, a hole is provided in an exterior case, and exhaust gas ejected from a discharge valve is discharged to outside. In this battery pack, it is difficult to safely discharge the high-temperature exhaust gas vigorously ejected from a battery cell to outside. In particular, since the exhaust gas ejected from the discharge valve of a lithium ion battery that is a non-aqueous electrolyte secondary battery is vigorously ejected at an abnormally high temperature higher than 400° C., the exhaust gas thermally may melt the exterior case and the exhaust gas is ejected to the outside of the case in a high-temperature state and ignited, significantly impairing safety.

The present invention has been developed in order to prevent the above adverse effects, and a main object of the present invention is to provide a battery pack that prevents a decrease in safety due to a high-temperature exhaust gas ejected from an opened discharge valve.

Solution to Problem

A battery pack according to an aspect of the present invention includes a battery block, a heat-resistant cap, a circuit board, and an exterior case. The battery block includes a plurality of battery cells and a battery holder positioning the plurality of battery cells at predetermined positions. Each of the plurality of battery cells includes a discharge valve configured to open when an internal pressure of each of the plurality of battery cells exceeds a predetermined pressure. The heat-resistant cap is coupled to an end of the battery block. The circuit board is disposed along a first surface of the battery block adjacent to an end surface of the battery block on which the heat-resistant cap is disposed. The circuit board is coupled to the battery block. The exterior case accommodates the battery block to which the heat-resistant cap and the circuit board are coupled therein. The exterior case includes an exhaust portion configured to discharge exhaust gas discharged from the discharge valve to an outside of the exterior case. A valve-side end surface of the each of the battery cells at which the discharge valve is provided is arranged at a first end of the battery block to which the heat-resistant cap is coupled. The heat-resistant cap includes a closing plate portion forming a first discharge gap between the closing plate and the end surface of the battery block, and a peripheral wall portion coupled to a periphery of the closing plate portion. The peripheral wall portion forms a second discharge gap between the peripheral wall portion and the first surface of the battery block. The circuit board is disposed to form a ventilation gap between the circuit board and the first surface of the battery block, the circuit board including an end edge portion toward the first end of the battery block. The end edge portion of the circuit board is placed on the peripheral wall portion. The ventilation gap communicates with the second discharge gap. The battery pack is configured to cause the exhaust gas discharged from the discharge valve of each of the plurality of battery cells to pass through the ventilation gap from a discharge gap including the first discharge gap and the second discharge gap and to be discharged from the exhaust portion to an outside of the battery pack.

Advantageous Effect of Invention

The battery pack of the present invention enhances safety by suppressing adverse effects caused by high-temperature exhaust gas ejected from the discharge valve of the battery cell.

DESCRIPTION OF EMBODIMENTS

A battery pack according to a first exemplary embodiment of the present invention includes a battery block, a heat-resistant cap, a circuit board, and an exterior case. The battery block includes a plurality of battery cells and a battery holder positioning the plurality of battery cells at predetermined positions. Each battery cell includes a discharge valve configured to open when an internal pressure of each battery cell exceeds a predetermined pressure. The heat-resistant cap is coupled to an end of the battery block. The circuit board is disposed along a first surface of the battery block adjacent to an end surface of the battery block on which the heat-resistant cap is disposed. The circuit board is coupled to the battery block. The exterior case accommodates the battery block to which the heat-resistant cap and the circuit board are coupled therein. The exterior case includes an exhaust portion configured to discharge exhaust gas discharged from the discharge valve to an outside of the exterior case. A valve-side end surface of each battery cell at which the discharge valve is provided is arranged at a first end of the battery block to which the heat-resistant cap is coupled. The heat-resistant cap includes a closing plate portion forming a first discharge gap between the closing plate and the end surface of the battery block, and a peripheral wall portion coupled to a periphery of the closing plate portion. The peripheral wall portion forms a second discharge gap between the peripheral wall portion and the first surface of the battery block. The circuit board is disposed to form a ventilation gap between the circuit board and the first surface of the battery block. The circuit board includes an end edge portion toward the first end of the battery block. The end edge portion of the circuit board is placed on the peripheral wall portion. The ventilation gap communicates with the second discharge gap. The battery pack is configured to cause the exhaust gas discharged from the discharge valve of each battery cell to pass through the ventilation gap from a discharge gap including the first discharge gap and the second discharge gap and to be discharged from the exhaust portion to an outside of the battery pack.

The battery pack described above eliminates adverse effects caused by the high-temperature exhaust gas ejected from the opening discharge valve, and ensures high safety. This is because the above battery pack causes the high-temperature exhaust gas ejected from the discharge valve to pass from the discharge gap formed between the first end of the battery block and the heat-resistant cap through the ventilation gap formed between the first surface of the battery block and the circuit board, and discharges the exhaust gas from the exhaust portion 15 to the outside. The battery pack guides the high-temperature exhaust gas discharged from the discharge valve from the first discharge gap to the second discharge gap, and further guides the exhaust gas from the second discharge gap to the ventilation gap to pass through the ventilation gap, and then discharges the exhaust gas from the exhaust portion of the exterior case to the outside. This structure causes the exhaust gas having high temperature and high energy ejected from the discharge valve to collide with the closing plate portion of the heat-resistant cap to reduce the energy, and causes the exhaust gas having the reduced energy to further pass through the ventilation gap from the second discharge gap in the first discharge gap to reduce the energy. In particular, when the exhaust gas passes through the ventilation gap, both kinetic energy and thermal energy are reduced by colliding with various members provided on the battery holder and the circuit board, so that the kinetic energy and thermal energy of the high-temperature exhaust gas discharged from the discharge valve are effectively reduced to eliminate the adverse effect caused by the high-temperature exhaust gas.

In a battery pack of a second exemplary embodiment of the present invention, the heat-resistant cap includes a sub-peripheral wall portion coupled to a periphery of the closing plate portion and coupled to an outer peripheral surface of the battery block.

In the above configuration, the heat resistant cap includes the sub-peripheral wall portion coupled to the outer peripheral surface of the battery block. This structure effectively prevents the exhaust gas from leaking to the surface side other than the first surface of the battery block while reliably coupling the heat-resistant cap to the end of the battery block. In particular, this structure effectively prevents the high-temperature exhaust gas discharged from the discharge valve from being directly ejected to the inner surface of the exterior case and damaging the exterior case.

In a battery pack of a third exemplary embodiment of the present invention, the heat-resistant cap further includes a partition wall provided between end surfaces of adjacent battery cells out of the plurality of battery cells. The partition wall partitions ng the first discharge gap into portions on respective end surfaces of the adjacent battery cells.

In the above configuration, the partition wall is provided between the end surfaces of the adjacent battery cells on a side of the end surface of the battery block of the closing plate. The first discharge gap is partitioned for each end surface of each battery cell by the partition wall. The exhaust gas discharged to the valve-side end surface of the battery cell is discharged while passing through the first discharge gap and the second discharge gap, so that both the energy of movement and the thermal energy of the exhaust gas is reduced and the gas is discharged to the outside while preventing thermal runaway of the battery cells.

In a battery pack of a fourth exemplary embodiment of the present invention, the exterior case includes a surface plate portion facing the circuit board to providing an expansion gap for the exhaust gas between the surface plate portion and the circuit board. The exterior case is configured to cause the exhaust gas passing through the ventilation gap to pass through the expansion gap and to be discharged from the exhaust portion to an outside of the exterior case.

In the above configuration, the exhaust gas that has passed through the ventilation gap passes through the expansion gap formed between the circuit board and the surface plate portion of the exterior case and discharged from the exhaust portion to the outside. This configuration causes the exhaust gas whose energy has been reduced by passing through the ventilation gap to be discharged to the outside while having the energy reduced by the expansion gap.

In a battery pack of a fifth exemplary embodiment of the present invention, the exhaust portion is provided at the surface plate portion at an end of the exterior case facing the first end of the battery block.

In the above configuration, the energy of the exhaust gas discharged from the exhaust portion is reliably reduced while having a structure in which the exhaust portion is provided on the surface plate portion at the end of the exterior case facing the first end of the battery block. In this structure, the exhaust gas is bypassed to the ventilation gap while the first end of the battery block where the discharge valve of the battery cell is arranged and the exhaust portion provided in the surface plate portion are arranged close to each other, and thus the energy is reliably reduced and the gas is discharged.

In a battery pack of a sixth exemplary embodiment of the present invention, the heat-resistant cap is made of reinforced plastic comprising resin and inorganic material embedded in the resin to reinforce the resin.

In a battery pack of a seventh exemplary embodiment of the present invention, the battery cells are cylindrical batteries. The cylindrical batteries have end surfaces flush with one another. The cylindrical batteries are arranged parallel to one another in the battery holder and constitute the battery block.

In a battery pack of an eighth exemplary embodiment of the present invention, the battery cells are lithium ion batteries.

Hereinafter, exemplary embodiments of the present invention will be described in detail with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Furthermore, parts denoted by the same reference mark in a plurality of drawings indicate an identical or equivalent parts or members.

Further, the following exemplary embodiments illustrate specific examples of the technical concept of the present invention, and the present invention is not limited by the following exemplary embodiments. In addition, unless otherwise specified, dimensions, materials, shapes, relative arrangements, and the like of the constituent elements described below are not intended to limit the scope of the present invention, but are intended to be illustrative. Further, the contents described in one exemplary embodiment and one working example are also applicable to other exemplary embodiments and working examples. Furthermore, the sizes and positional relationships of members illustrated in the drawings may be exaggerated in order to clarify description.

Figure 1:
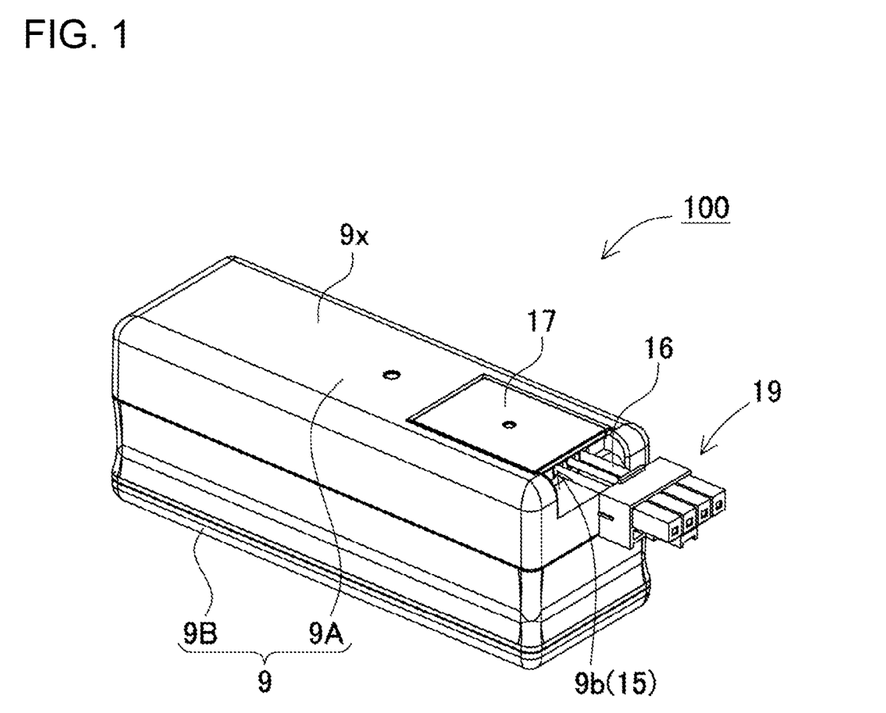
FIG. 1 is a perspective view of a battery pack according to an exemplary embodiment of the present invention.
Figure 2:
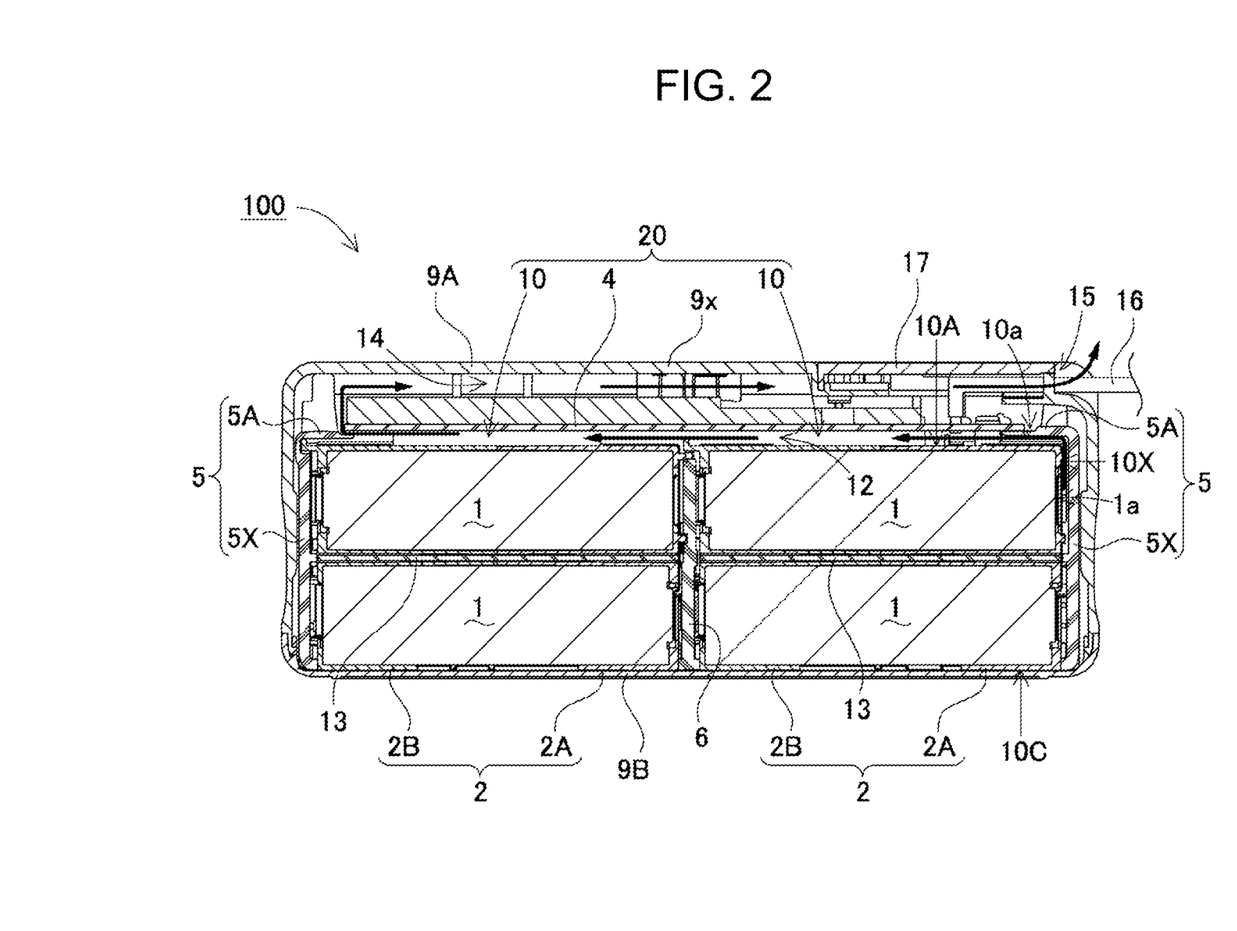
FIG. 2 is a vertical longitudinal sectional view of the battery pack illustrated in FIG. 1.
Figure 3:
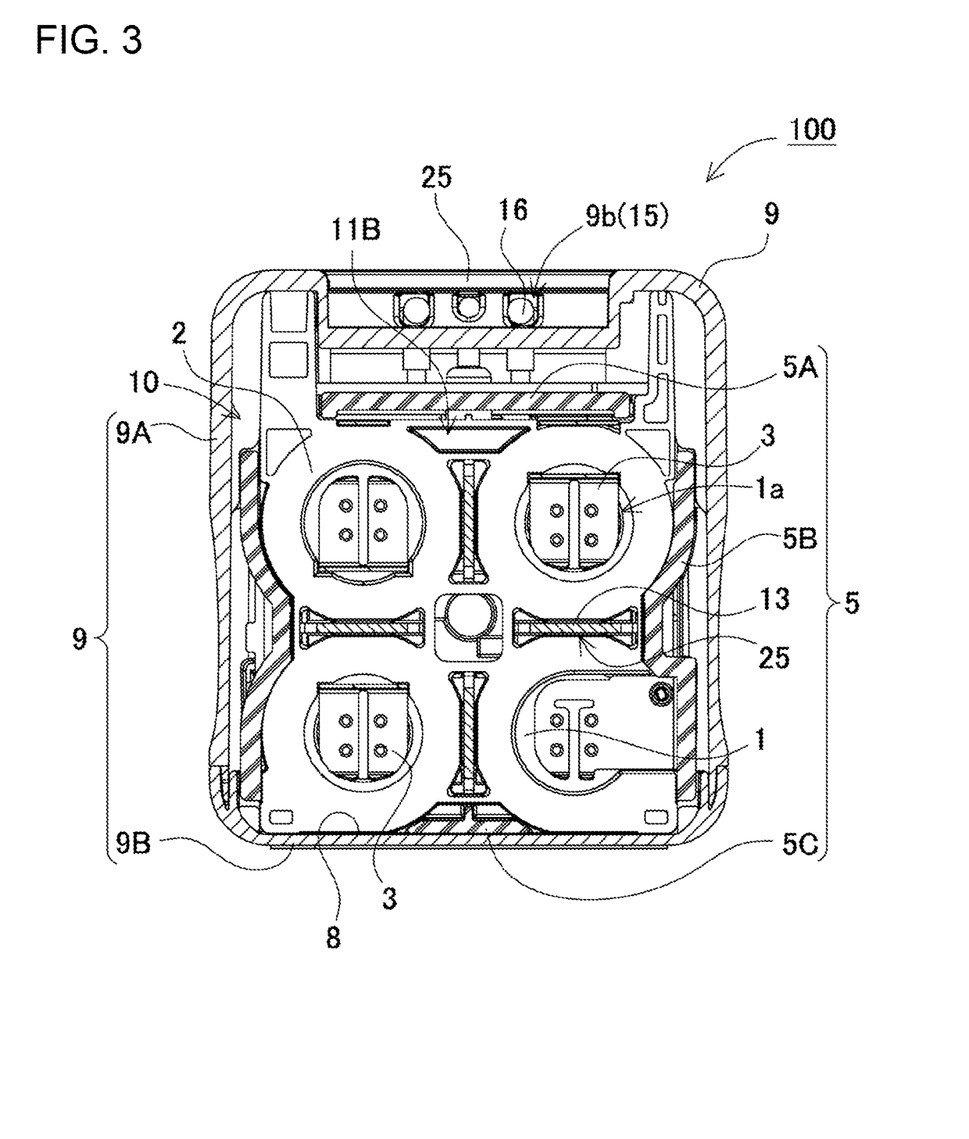
FIG. 3 is a vertical transverse sectional view of the battery pack illustrated in FIG. 1.
Figure 4:
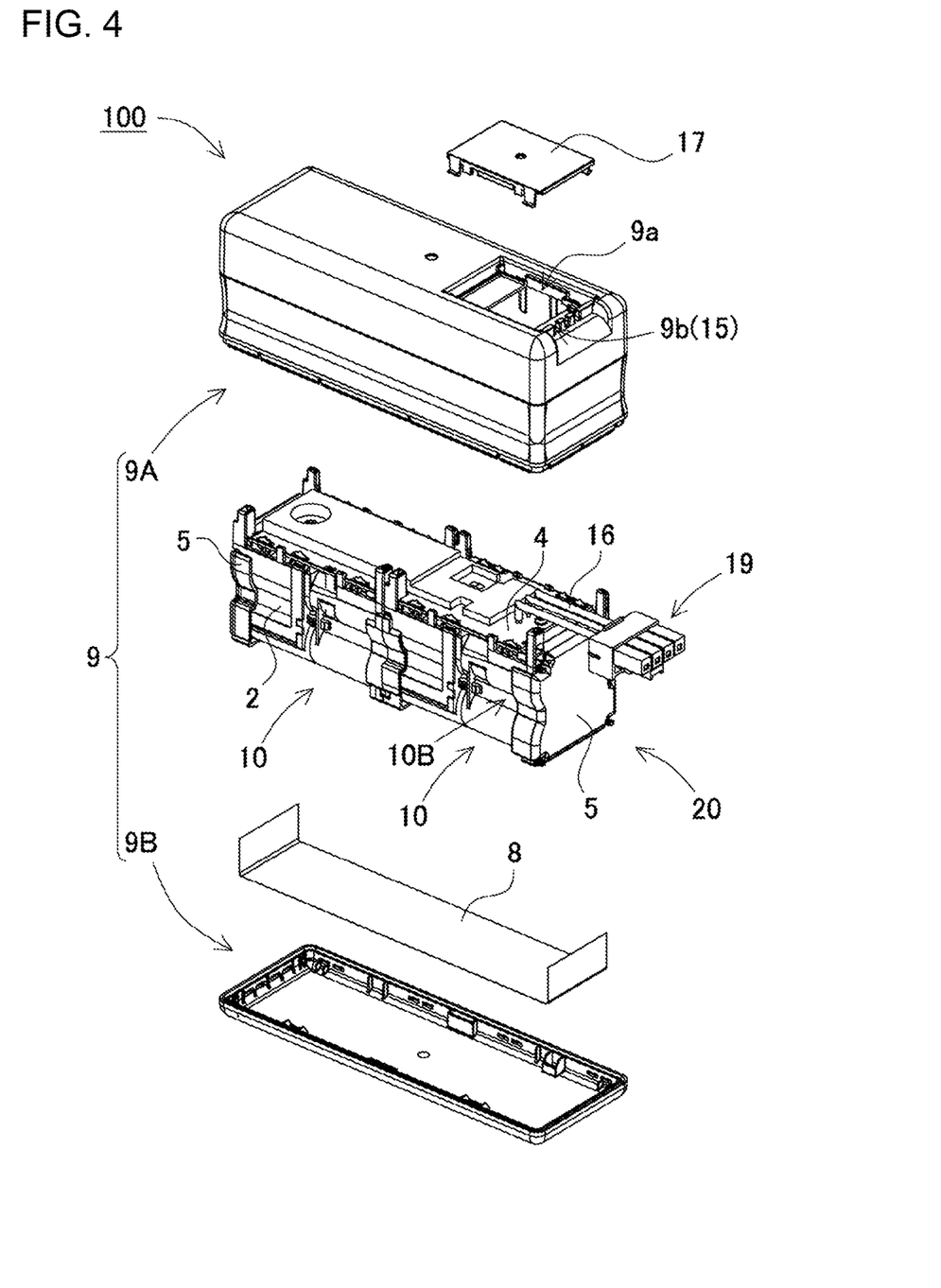
FIG. 4 is an exploded perspective view of the battery pack illustrated in FIG. 1.
Figure 5:
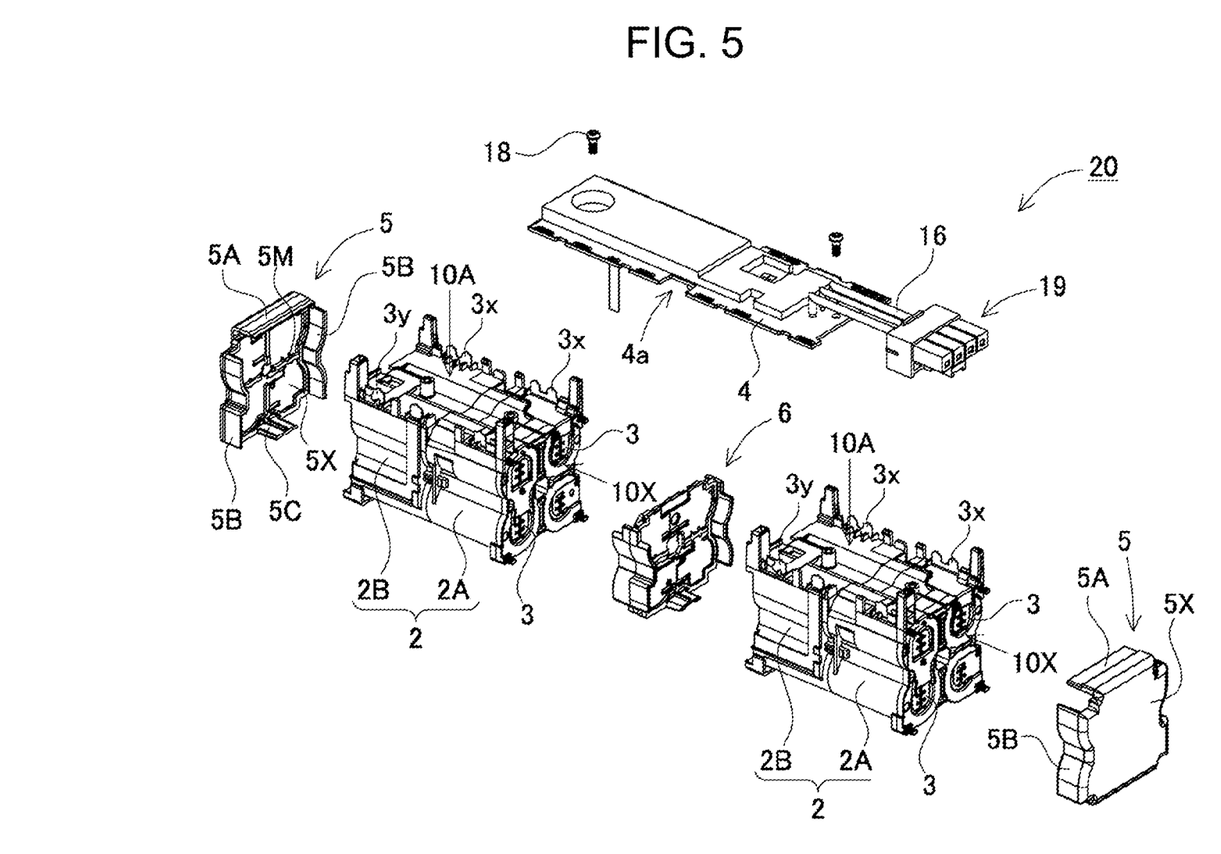
FIG. 5 is an exploded perspective view of a core pack of the battery pack illustrated in FIG. 4.
Figure 6:
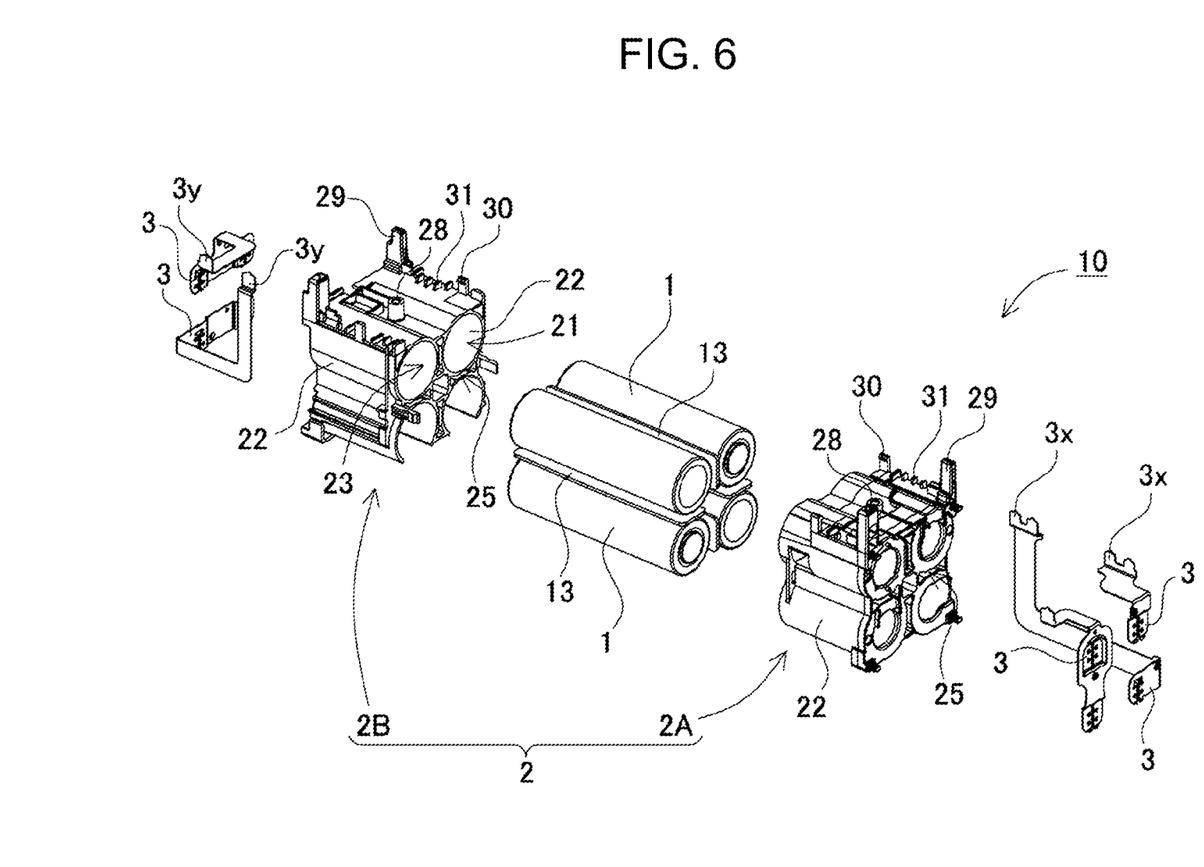
FIG. 6 is an exploded perspective view of a battery block illustrated in FIG. 5.
Figure 7:
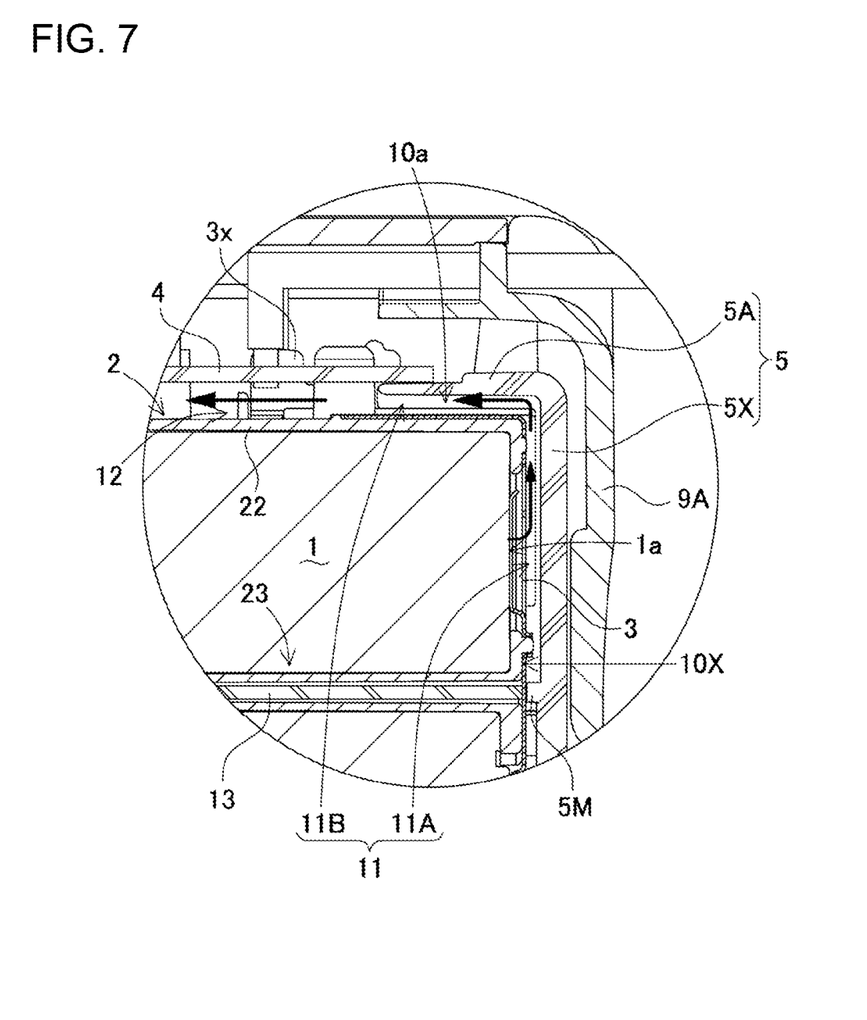
FIG. 7 is an enlarged sectional view of a main part of the battery pack illustrated in FIG. 2.

FIGS. 1 to 7 illustrate a battery pack according to an exemplary embodiment of the present invention. FIG. 1 is a perspective view of a battery pack. FIG. 2 is a vertical longitudinal sectional view of the battery pack. FIG. 3 is a vertical transverse sectional view of the battery pack. FIG. 4 is an exploded perspective view of the battery pack. FIG. 5 is an exploded perspective view of a core pack of the battery pack. FIG. 6 is an exploded perspective view of a battery block. FIG. 7 is an enlarged sectional view of a main part of FIG. 2.

Battery pack 100 illustrated in FIGS. 1 to 6 includes battery block 10 including battery cells 1 positioned at predetermined positions by battery holder 2, heat-resistant cap 5 coupled to an end of battery block 10, circuit board 4 arranged along first surface 10A of battery block 10 and coupled to battery block 10, and exterior case 9 accommodating battery block 10 to which heat-resistant cap 5 and circuit board 4 are coupled therein.

Battery pack 100 is used, for example, as a power source of a portable electric device, such as a vacuum cleaner. The present invention may be used also as a power source of other electric devices, such as an electric power tool, a power-assisted bicycle, and the like without specifying an electric device as a use of the battery pack. The battery pack may be structured to be detachably coupled to an electric device, or may be incorporated non-detachably in an electric device.

Battery Cell 1

Battery cell 1 is a cylindrical battery having end surface 1a provided with a discharge valve configured to open when an internal pressure of the battery exceeds a predetermined pressure. Each cylindrical battery includes a cylindrical metal case accommodates therein electrodes and an electrolytic solution. The metal case has a sealed structure in which a sealing plate is hermetically fixed to an opening portion of a cylindrical package can with a closed bottom. The package can is fabricated by pressing a metal plate into a cylindrical shape. The sealing plate is crimped and hermetically fixed to a peripheral edge of the opening portion of the package can with a packing made of insulating material interposed between the sealing plate and the package can.

Although not illustrated, a discharge valve is provided on the sealing plate of battery cell 1 in order to prevent damage due to an abnormally high internal pressure of the metal case. In battery cell 1, an opening portion of the discharge valve that opens and discharges internal gas or the like is provided in the sealing plate. In battery cell 1, the discharge valve and the opening portion may be provided at the bottom of the package can. The discharge valve is configured to open when the internal pressure rises more than a predetermined pressure, for example, 1.5 MPa, and prevents the metal can from such a breakage due to the increase of the internal pressure. The discharge valve is configured to open in an abnormal state. Accordingly, when the discharge valve opens, a temperature of battery cell 1 is very high. The gas and the electrolytic solution (ejected matter) discharged from the opened discharge valve have an abnormally high temperature accordingly. Particularly in a battery pack in which battery cell 1 is a non-aqueous electrolyte secondary battery, such as a lithium ion battery, exhaust gas has an abnormally high temperature higher than 400° C. Furthermore, each of the lithium ion batteries is filled with a non-aqueous electrolytic solution. When this solution is discharged to the outside of the case at high temperature, this solution may contact air and catches fire, and reaches a more abnormally high temperature. In not only the lithium ion battery but also other chargeable batteries, since the exhaust gas ejected from the opened discharge valve has a high temperature, the energy of the exhaust gas is to be reduced and the exhaust gas is to be discharged to the outside of the case for enhancing safety.

Battery Block 10

As illustrated in FIG. 6, battery block 10 includes battery cells 1 arranged in parallel to one another via battery holder 2 made of plastic between the battery cells. In illustrated battery block 10, four battery cells 1 are arranged in two rows and two stages in battery holder 2. In illustrated battery block 10, four battery cells 1 are arranged in two rows and two stages, and are connected in series to one another via lead plates 3. In battery block 10 illustrated in the drawing, four battery cells 1 are arranged in two rows and two stages and connected in series to one another. However, the number and connection of battery cells 1 may be arbitrarily changed. Each of battery blocks 10 may be commonly produced by arranging battery cells 1 with the same outer shape, for example, cylindrical batteries with the same dimensions at fixed positions in battery holder 2 with the same shape and connecting battery cells 1 by lead plates 3 with the same shape. Battery blocks 10 made of all common components may be mass-produced inexpensively.

Battery Holder 2

In battery holder 2 shown in FIGS. 5 and 6, battery cells 1 are arranged in parallel to one another with a terminal surface of the batteries at respective both ends arranged on the same plane. Battery holder 2 arranges battery cells 1 in multiple stages and multiple rows. Battery holder 2 in the drawings is molded from plastic into a shape including holding tubes 22 in which four battery cells 1 are arranged at predetermined positions. Battery holder 2 has a shape in which four holding tubes 22 are coupled in parallel in two rows and two stages. Insides of holding tubes 22 are substantially equal to outer shapes of battery cells 1 to form holding part 21.

In battery block 10 illustrated in FIG. 6, battery holder 2 is divided in a longitudinal direction of battery cells 1 into first battery holder 2A and second battery holder 2B. Battery holder 2 allows smooth insertion of elongated battery cells 1. First battery holder 2A and second battery holder 2B are separately manufactured by molding plastic, and are coupled to each other after battery cells 1 are inserted into the holders. First battery holder 2A and second battery holder 2B include respective cylindrical holding tubes 22 for inserting cylindrical battery cells 1 into the tubes and arranging the battery cells at the predetermined positions. An inner shape of each holding tube 22 is substantially identical to an outer shape of battery cell 1. The inner shape of each holding tube 22 is slightly larger than the outer shape of battery cell 1 to smoothly insert and arrange battery cells 1 at the predetermined positions. First battery holder 2A and second battery holder 2B of this structure are coupled to each other at a predetermined position while battery cells 1 are disposed between the holders in a state where both ends of cylindrical battery cells 1 are inserted into the holders. First battery holder 2A and second battery holder 2B may have opposing surfaces configured to be engaged with each other to be more accurately coupled to each other, and are also coupled together at predetermined positions with a unmeltable plate described later interposed between the holders. First battery holder 2A and second battery holder 2B which are coupled to each other with battery cells 1 interposed between the holders are coupled to circuit board 4 and are held to be coupled each other.

Battery block 10 illustrated in FIGS. 3 and 6 has holding tubes 22 arranged between adjacent battery cells 1 as demarcation walls 23, and unmeltable plates 13, such as mica plates, disposed between demarcation walls 23. In battery holder 2 in the drawings, since battery cells 1 are arranged in two rows and two stages, demarcation wall 23 with a cross shape is provided among four battery cells 1 arranged vertically and horizontally. Demarcation walls 23 provides insertion gaps 25 therebetween into which unmeltable plates 13 is inserted. Demarcation walls 23 have unmeltable plates 13, such as mica plates, inserted in insertion gaps 25. Battery block 10 prevent thermal runaway from being induced in adjacent battery cells 1 while any one of battery cells 1 causes thermal runaway and generates abnormal heat.

Lead Plates 3

Battery cells 1 of battery blocks 10 are electrically connected in series via lead plates 3. Lead plate 3 is formed by bending a metal plate having excellent conductivity. Lead plates 3 are welded and fixed to electrodes provided on the end surfaces of battery cells 1. In battery block 10 illustrated in FIG. 6, battery cells 1 are connected in series to each other by lead plates 3 to increase an output voltage. However, battery block 10 may have battery cells 1 connected in parallel by lead plates 3 or may have battery cells 1 connected in series and in parallel by lead plates 3. Lead plates 3 connecting battery cells 1 to each other are connected to circuit board 4.

Heat-Resistant Cap 5

In battery pack 100 illustrated in FIGS. 2 to 5, heat-resistant cap 5 is coupled to an end of core pack 20 in order to reduce energy of the exhaust gas ejected from the discharge valve of battery cell 1 arranged at first end 20a of core pack 20 and discharge the gas. Heat-resistant cap 5 is manufactured by molding thermoplastic plastic having heat resistance characteristics superior to those of battery holder 2 and exterior case 9. For example, a PBT resin or the like, which is a fiber-reinforced plastic including inorganic fibers, such as glass fibers, embedded therein for reinforcing is molded and produced as a plastic excellent in heat resistance characteristics. Heat-resistant cap 5 coupled to the end of battery block 10 reduces energy of exhaust gas ejected from a valve-side end surface of battery cell 1, and changes a flow direction. Heat-resistant cap 5 includes closing plate portion 5X facing end surface 10X of battery block 10, and peripheral wall portions 5A, 5B, and 5C coupled to a periphery of closing plate portion 5X. Closing plate portion 5X and peripheral wall portions 5A, 5B, 5C are unitarily molded into an integral structure.

Closing plate portion 5X provides discharge gap 11 between closing plate portion 5X and end surface 10X of battery block 10 in order to allow the exhaust gas ejected from the discharge valve to efficiently flow into exhaust duct 7. Closing plate portion 5X causes the exhaust gas ejected from the discharge valve to collide with an inner surface in discharge gap 11 to reduce energy. Discharge gap 11 provided between closing plate portion 5X and end surface 10X of battery block 10, more precisely, between closing plate portion 5X and end surface 1a of battery cell 1 has a size, for example, 0.5 mm or more and 3 mm or less so as to reduce energy of movement of the exhaust gas while smoothly exhausting the exhaust gas. Lead plate 3 fixed to battery cell 1 is arranged in discharge gap 11.

The exhaust gas passing through first discharge gap 11A is weakened by closing plate portion 5X and collides with an inside of peripheral wall portion 5A. Peripheral wall portion 5A provides second discharge gap 11B between peripheral wall portion 5A and first surface 10A (an upper surface in the drawings) of battery block 10 in order to redirect and discharge the exhaust gas flowing in from first discharge gap 11A. Peripheral wall portion 5A causes the exhaust gas flowing in from first discharge gap 11A to collide with the inside to reduce the energy, and changes the flow direction perpendicularly without further scattering the energy to the periphery, and changes the flow direction to the longitudinal direction of battery cells 1. The exhaust gas collides with an inner surface of peripheral wall portion 5A, is redirected, has the energy of the motion reduced, and is discharged in the longitudinal direction of battery cell 1.

Peripheral wall portion 5A provides second discharge gap 11B between peripheral wall portion 5A and first surface 10A in order to allow the exhaust gas to flow between peripheral wall portion 5A and battery block 10. Peripheral wall portion 5A illustrated in FIGS. 3 and 7 is disposed away from first surface 10A on which circuit board 4 is disposed, and forms second discharge gap 11B that guides the exhaust gas between peripheral wall portion 5A and first surface 10A. The exhaust gas that has collided with the inside of closing plate portion 5X and flowed into second discharge gap 11B flows into ventilation gap 12 formed between circuit board 4 and battery block 10. In heat-resistant cap 5 illustrated in the drawings, a tip of peripheral wall portion 5A is placed on the end edge portion of circuit board 4 so as to cause the exhaust gas that has passed through second discharge gap 11B to smoothly flow into ventilation gap 12 formed between circuit board 4 and battery block 10. Heat-resistant cap 5 illustrated in FIG. 7 is arranged such that the tip of peripheral wall portion 5A is inserted between first surface 10A of battery block 10 and circuit board 4 in plan view. Second discharge gap 11B communicates with ventilation gap 12. Peripheral wall portion 5A is preferably placed on circuit board 4 and contacts circuit board 4. However, the peripheral wall portion may be stacked on the circuit board while not contacting the circuit board. The peripheral wall portion may be stacked on an upper surface of the circuit board.

Heat-resistant cap 5 illustrated in FIGS. 3 and 5 further includes sub-peripheral wall portions 5B and 5C coupled to a periphery of closing plate portion 5X and coupled to an outer peripheral surface of battery block 10. The heat-resistant cap illustrated in the drawings includes sub-peripheral wall portion 5B coupled to second surface 10B (both side surfaces in the drawings) that is the outer peripheral surface of battery block 10 and adjacent to first surface 10A, and sub-peripheral wall portion 5C coupled to third surface 10C (a bottom surface in the drawings) opposing first surface 10A. As illustrated in FIG. 3, in heat-resistant cap 5, sub-peripheral wall portion 5B is coupled to the outside of second surface 10B of battery block 10, and sub-peripheral wall portion 5C is coupled to an outside (lower surface) of third surface 10C of battery block 10. That is, heat-resistant cap 5 is coupled to a predetermined position on the end of battery block 10 while sub-peripheral wall portions 5B and 5C are securely contact the outer peripheral surface of battery block 10. As described above, heat-resistant cap 5 including sub-peripheral wall portions 5B and 5C coupled in contact with the outer peripheral surface of battery block 10 prevent the exhaust gas ejected into first discharge gap 11A from leaking to the both sides and the lower side of battery block 10, and reliably guide the exhaust gas discharged into first discharge gap 11A to second discharge gap 11B. However, heat-resistant cap 5 may not necessarily include both sub-peripheral wall portion 5B coupled to the side surface of battery block 10 and sub-peripheral wall portion 5C coupled to the bottom surface, and may include only one of sub-peripheral wall portion 5B or sub-peripheral wall portion 5C.

Heat-resistant cap 5 illustrated in FIGS. 5 and 7 further includes partition wall 5M disposed between respective end surfaces 1a of adjacent battery cells 1 to partition first discharge gap 11A into two portions on respective end surfaces 1a of battery cells 1. Partition wall 5M is fixed perpendicularly to an inner surface of closing plate portion 5X to define first discharge gap 11A provided between partition wall 5M and end surface 1a of battery cell 1. Partition wall 5M partitions a gap provided between closing plate portion 5X and the valve-side end surface of an abnormal battery cell with the opening discharge valve and a gap between closing plate portion 5X and the adjacent battery cell. When battery cell 1 thermally runs away due to, for example, an internal short circuit or the like, the internal pressure abnormally rises and the discharge valve opens. In this state, the exhaust gas ejected from the discharge valve has an abnormally high temperature. When the high-temperature exhaust gas heats the adjacent battery cell, this becomes a cause of inducing thermal runaway. Partition wall 5M prevents the high-temperature exhaust gas from flowing to the end surface of the adjacent battery cell to prevent induction of thermal runaway. Since partition wall 5M prevents the exhaust gas ejected from the abnormal battery cell from heating adjacent battery cells 1, partition wall 5M partitions first discharge gap 11A between battery cells 1.

Partition wall 5M prevents ejected exhaust gas from flowing to end surface 1a of adjacent battery cell 1, and suppresses the exhaust gas from heating adjacent battery cell 1. Partition wall 5M protrudes from closing plate portion 5X to first discharge gap 11A, and is disposed between respective end surfaces 1a of battery cells 1. Partition wall 5M disposed in first discharge gap 11A has a shape protruding from the inner surface of closing plate portion 5X, and contacts the surface of lead plate 3 to divide first discharge gap 11A into respective portions at between battery cells 1.

Circuit Board 4

Circuit board 4 has a protection circuit mounted thereon. The protection circuit charges and discharges battery cells 1. Circuit board 4 connects battery cells 1 to the protection circuit. The protection circuit is configured to detect the voltage and current of each battery cell 1 and controls the current for charging and discharging the cells to protect the battery while charging/discharging. Circuit board 4 is connected to output lead part 3x for inputting positive or negative output of each battery block 10, or is connected to intermediate potential lead part 3y for measuring intermediate potential in order to detect a voltage of each battery cell 1. In addition, circuit board 4 may be connected to potential of a temperature detector (not illustrated) for detecting a temperature of each battery cell 1. The temperature detector may be implemented by a thermistor or the like.

Circuit board 4 is arranged along first surface 10A (upper surface in the drawings) of battery block 10 adjacent to end surface 10X of battery block 10 on which heat-resistant cap 5 is arranged thereon. Circuit board 4 is arranged to provide a gap formed between circuit board 4 and first surface 10A of battery block 10. Ventilation gap 12 is a gap through which the exhaust gas discharged from the discharge valve of battery cell 1 and passed through first discharge gap 11A and second discharge gap 11B passes. The high-temperature exhaust gas by passing through ventilation gap 12 contacts members provided on battery holder 2 and circuit board 4, and kinetic energy and thermal energy are reduced. Circuit board 4 is fixed to battery block 10 such that a width of ventilation gaps 12 ranges, for example, from 2.5 mm to 3.0 mm.

Circuit board 4 is coupled to a predetermined position on first surface 10A of battery block 10 to allow ventilation gap 12 to have a predetermined width. In battery holder 2 illustrated in the perspective view of FIG. 6, in order to couple circuit board 4 at a predetermined position, fitting projections 29 project on an opposing surface (the upper surface in the diagram) facing circuit board 4. Fitting projections 29 are hollow columnar bosses that vertically project upward from four corner portions of the opposing surface, and are molded integrally with the plastic of battery holder 2. As illustrated in FIG. 4, fitting projections 29 guide fitting recess 4a provided in circuit board 4 to arrange circuit board 4 at a fixed position. Further, battery holder 2 illustrated in FIG. 6 further has mounting ribs 31 integrally molded for mounting circuit board 4 thereon at plural positions on the opposing surface and determining the vertical position of circuit board 4. Mounting ribs 31 are provided at positions on both sides of the opposing surface of battery holder 2, and position circuit board 4 at a predetermined position with maintaining a predetermined interval between the circuit board and first surface 10A. Further, battery block 10 of FIG. 6 has locking hooks 30 for circuit board 4 integrally molded and provided on an opposing surface of battery holder 2. As illustrated in FIG. 4, locking hooks 30 lock circuit board 4 arranged on first surface 10A and arranges the circuit board at the predetermined position. In circuit board 4, output lead parts 3x and intermediate potential lead parts 3y projecting from first surfaces 10A of battery blocks 10 are inserted into through holes of circuit board 4, fitting projections 29 of battery holders 2 are guided to fitting recess portion 4a, a bottom surface is placed on mounting ribs 31 and arranged at the fixed position, so that circuit board 4 is locked by locking hooks 30 and arranged at the predetermined position. While circuit board 4 is disposed at the predetermined position by locking hooks 30, output lead parts 3x and intermediate potential lead parts 3y are soldered to connection parts on circuit board 4 to couple battery blocks 10.

Further, circuit board 4 illustrated in the drawings couples battery blocks 10 to one another, electrically connect battery blocks 10 to one another, and further physically couples battery blocks 10 to one another. In battery pack 100 illustrated in the exploded perspective view of FIG. 5, circuit board 4 is screwed to two battery blocks 10 with screws 18 passing through circuit board 4 to further firmly couple battery blocks 10. Battery blocks 10 each have fixing boss 28 into which screw 18 are to be screwed on the opposing surface of battery holder 2.

Output lead parts 3x of each battery block 10 are connected with circuit board 4 interposed between and further connected to connector 19. Circuit board 4 includes a conductive layer (not illustrated) such as a copper foil on a surface thereof. The conductive layer electrically connects connection parts of output lead parts 3x in series to connect battery blocks 10, and also connects output lead parts 3x to lead wire 16 of connector 19. Further, the conductive layer connects connection parts of intermediate potential lead parts 3y to the protection circuit of circuit board 4.

As described above, battery blocks 10 are fixed to circuit board 4 while being linearly coupled to form core pack 20 of the battery. In core pack 20 illustrated in the drawings, two battery blocks 10 are linearly coupled to each other. Insulation plate part 6 is arranged between opposing battery blocks 10 to insulate the battery blocks from each other. Heat-resistant cap 5 is coupled to both ends. Circuit board 4 is coupled to first surface 10A of battery block 10. Insulation plate part 6 is arranged between battery blocks 10 arranged side by side in the longitudinal direction. Insulation plate part 6 is produced by molding a material having excellent insulating properties and heat insulating properties, for example, a PBT resin or the like which is a fiber-reinforced plastic in which inorganic fibers, such as glass fibers, are embedded and reinforced. However, an inorganic plate, such as a mica plate, may also be used for the insulation plate part.

Exterior Case 9

Exterior case 9 has a rectangular tubular box shape as illustrated in FIGS. 1 to 4. Exterior case 9 illustrated in the drawings is divided into two parts, case body 9A and closing part 9B. As illustrated in FIG. 3, core pack 20 of a battery including two sets of battery blocks 10, heat-resistant cap 5, partition wall 6. Circuit board 4 is accommodated inside exterior case 9. Exterior case 9 includes connector 19 drawn to the outside for connecting with an electric device to be powered by battery pack 100. Exterior case 9 is made of a material having excellent electrical insulating properties and thermal insulating properties, such as polycarbonate, ABS, or a resin obtained by combining them.

Exterior case 9 described above has exhaust portion 15 configured to discharge the exhaust gas discharged from the discharge valve to the outside. In exterior case 9 illustrated in the drawings, a portion that is an end of case body 9A and from which connector 19 is drawn out to the outside of the case is exhaust portion 15. Exterior case 9 has a structure in which open window 9a is provided in case body 9, and lead wire 16 is guided to groove 9b provided in an opening edge portion of open window 9a to draw out connector 19 to the outside of the case. Therefore, in the exterior case, open window 9a and groove 9b from which the lead wire is drawn out serve as the exhaust portion discharging the exhaust gas in the case to the outside. In exterior case 9, after connector 19 passes through open window 9a opening in case body 9A and core pack 20 of the battery is accommodated in case body 9A, case body 9A is closed by lid part 9B. After lead wire 16 passes through groove 9b provided in the peripheral edge portion of open window 9a, open window 9a of case body 9A is closed by closure lid 17.

Exterior case 9 illustrated in FIG. 2 further includes surface plate portion 9x in which case body 9A opposes circuit board 4. In exterior case 9, expansion gap 14 of the exhaust gas is formed between circuit board 4 and surface plate portion 9x while core pack 20 of the battery is accommodated inside. Battery pack 100 allows the exhaust gas passing through ventilation gap 12 to pass through expansion gap 14 and be discharged from exhaust portion 15 to the outside. As described above, In the structure in which the exhaust gas that has passed through ventilation gap 12 passes through expansion gap 14 and is discharged from exhaust portion 15 to the outside, the exhaust gas with energy reduced in ventilation gap 12 may be discharged to the outside by further reducing the energy in expansion gap 14.

Exterior case 9 illustrated in FIG. 2 further has exhaust portion 15 provided in surface plate portion 9x at the end of the case facing first end 20a of core pack 20. Battery pack 100 having the above structure reliably reduces the energy of the exhaust gas discharged from exhaust portion 15 while having a structure in which exhaust portion 15 is provided in surface plate portion 9x at the end of exterior case 9 facing first end 20a of core pack 20. In this structure, first end 20a of core pack 20 where the discharge valve of battery cell 1 is arranged and exhaust portion 15 provided in surface plate portion 9x are arranged close to each other. This structure allows the exhaust gas to bypass to exhaust passage 24, thereby reliably reducing the energy of the gas and discharging the gas. While the linear distance between the discharge valve of battery cell 1 and exhaust portion 15 of exterior case 9 is shortened, the path of the exhaust gas may be lengthened to reliably reduce the energy of the gas.

Note that in the exterior case illustrated in FIG. 3, exhaust portion 15 is provided at an end of the surface plate portion of case body 9A on the same side as first end 10a provided in battery block 10. Exhaust portion 15 may be provided at a center or a side surface of surface plate portion 9x of case body 9A. Also in this case, the exhaust gas discharged from valve-side end surface 1a of battery cell 1 arranged at first end 10a of battery block 10 passes through ventilation gap 12 from discharge gap 11 including first discharge gap 11A and second discharge gap 11B, passes through expansion gap 14 from ventilation gap 12, and is then discharged from exhaust portion 15 to the outside. As described above, in the battery pack of the present invention, the high-temperature exhaust gas passes through ventilation gap 12 formed between battery block 10 and circuit board 4, thereby having the energy be reliably reduced and the gas is discharged to the outside while the path of the exhaust gas is lengthened. Further, battery pack 100 discharges the exhaust gas to the outside while reducing the energy by lengthening the path of the exhaust gas also at the valve-side end surface of the battery cell arranged at a position other than first end 10a of battery block 10.

Heat Dissipation Plate 8

In battery pack 100 of FIG. 4, heat dissipation plate 8 is disposed on a lower surface of core pack 20 in order to more effectively reduce the energy of the exhaust gas. Heat dissipation plate 8 is arranged inside closing part 9B of exterior case 9 and between exterior case 9 and battery block 10, and reduces energy of exhaust gas ejected from battery cell 1. Heat dissipation plate 8 may be preferably made of a plate material having better thermal conduction characteristics than exterior case 9. Heat dissipation plate 8 is configured to absorb thermal energy of the colliding exhaust gas, quickly diffuse the absorbed thermal energy over a wide area to conduct the thermal energy to exterior case 9, and exterior case 9 dissipates the thermal energy to the outside over a wide area.

As a plate material having preferable thermal conduction characteristics, a metal plate is used for heat dissipation plate 8. In particular, an aluminum (including an aluminum alloy) plate is suitable as heat dissipation plate 8. Since the aluminum plate has heat resistance and excellent thermal conduction characteristics and is light, the thermal energy of the exhaust gas is quickly diffused and efficiently dissipated while reducing the weight. Battery pack 100 in FIG. 4 has a belt shape extended along the longitudinal direction of closing part 9B, and is arranged between heat-resistant cap 5 and exterior case 9 with both ends bent in an L shape. Thus, case coupling portions at both ends of exterior case 9 are covered from the inside, and the exhaust gas discharged from the discharge valve is prevented from being discharged to the outside from such portions.

INDUSTRIAL APPLICABILITY

A battery pack according to the present invention is suitably used for a battery pack used as a power source for portable electric devices, such as vacuum cleaners, electric tools, and power-assisted bicycles.

REFERENCE MARKS IN THE DRAWINGS 100 battery pack
1 battery cell
1a end surface
2 battery holder
2A first battery holder
2B second battery holder
3 lead plate
3x output lead part
3y intermediate potential lead part
4 circuit board
4a fitting recess
5 heat-resistant cap
5X closing plate portion
5A peripheral wall portion
5B second peripheral wall portion
5C third peripheral wall portion
5M partition wall
6 insulation plate part
8 heat dissipation plate
9 exterior case
9A case body
9a open window
9b groove
9x surface plate portion
9B closing part
10 battery block
10a first end
10X end surface
10A first surface
10B second surface
10C third surface
11 discharge gap
11A first discharge gap
11B second discharge gap
12 ventilation gap
13 non-melting plate
14 expansion gap
15 exhaust portion
16 lead wire
17 closure lid
18 set screw
19 connector
20 core pack
21 holding part
22 holding tube
23 partition wall
25 insertion gap
28 fixing boss
29 fitting projection
30 locking hook
31 mounting rib

The invention claimed is:

1. A battery pack comprising:
a battery block including a plurality of battery cells and a battery holder positioning the plurality of battery cells at predetermined positions, each of the plurality of battery cells including a discharge valve configured to open when an internal pressure of each of the plurality of battery cells exceeds a predetermined pressure;
a heat-resistant cap coupled to an end of the battery block;
a circuit board disposed along a surface of the end of the battery block adjacent to an end surface of the battery block on which the heat-resistant cap is disposed, the circuit board being coupled to the battery block; and
an exterior case accommodating the battery block therein, the exterior case including an exhaust portion configured to discharge exhaust gas discharged from the discharge valve to an outside of the exterior case, wherein
a valve-side end surface of each of the battery cells, at which the discharge valve is provided, is arranged at the end of the battery block to which the heat-resistant cap is coupled,
the heat-resistant cap includes:
a closing plate portion forming a first discharge gap between the closing plate portion and the end surface of the battery block; and
a peripheral wall portion coupled to a periphery of the closing plate portion, the peripheral wall portion forming a second discharge gap between the peripheral wall portion and the surface of the battery block,
the circuit board is disposed to form a ventilation gap between the circuit board and the surface of the battery block, the circuit board including an end edge portion toward the end of the battery block, the end edge portion of the circuit board being placed on the peripheral wall portion, the ventilation gap communicating with the second discharge gap, and
the battery pack is configured to cause the exhaust gas discharged from the discharge valve of each of the plurality of battery cells to pass through the ventilation gap from a discharge gap including the first discharge gap and the second discharge gap and to be discharged from the exhaust portion to an outside of the battery pack.

2. The battery pack according to claim 1, wherein the heat-resistant cap includes a sub-peripheral wall portion coupled to a periphery of the closing plate portion and coupled to an outer peripheral surface of the battery block.

3. The battery pack according to claim 1, wherein the heat-resistant cap further includes a partition wall provided between end surfaces of adjacent battery cells out of the plurality of battery cells, the partition wall partitioning the first discharge gap into portions on respective end surfaces of the adjacent battery cells.

4. The battery pack according to claim 1, wherein the exterior case includes a surface plate portion facing the circuit board to provide an expansion gap for the exhaust gas between the surface plate portion and the circuit board, and the exterior case is configured to cause the exhaust gas passing through the ventilation gap to pass through the expansion gap and to be discharged from the exhaust portion to an outside of the exterior case.

5. The battery pack according to claim 4, wherein the exhaust portion is provided at the surface plate portion at an end of the exterior case facing the end of the battery block.

6. The battery pack according to claim 1, wherein the heat-resistant cap is made of reinforced plastic comprising resin and inorganic material embedded in the resin to reinforce the resin.

7. The battery pack according to claim 1, wherein the plurality of battery cells are cylindrical batteries, the plurality of cylindrical batteries have end surfaces flush with one another, and the plurality of cylindrical batteries are arranged parallel to one another in the battery holder and constitute the battery block.

8. The battery pack according to claim 7, wherein the plurality of battery cells comprise lithium ion batteries.

* * * * *